(12) United States Patent
Hyvonen

(10) Patent No.: US 8,532,988 B2
(45) Date of Patent: Sep. 10, 2013

(54) SEARCHING FOR SYMBOL STRING

(75) Inventor: Jorkki Hyvonen, Helsinki (FI)

(73) Assignee: Syslore Oy, Helsinki (FI)

( * ) Notice: Subject to any disclaimer, the term of this patent is extended or adjusted under 35 U.S.C. 154(b) by 2641 days.

(21) Appl. No.: 10/520,171

(22) PCT Filed: Jul. 3, 2003

(86) PCT No.: PCT/FI03/00540
§ 371 (c)(1),
(2), (4) Date: Jan. 4, 2005

(87) PCT Pub. No.: WO2004/006126
PCT Pub. Date: Jan. 15, 2004

(65) Prior Publication Data
US 2005/0278175 A1  Dec. 15, 2005

(30) Foreign Application Priority Data
Jul. 5, 2002 (FI) ...................................... 20021330

(51) Int. Cl.
*G10L 15/00* (2013.01)
(52) U.S. Cl.
USPC ........... 704/238; 715/268; 715/259; 714/795; 707/3; 704/4; 704/275; 704/270; 704/254; 704/233; 704/231; 704/220; 704/219; 704/10; 701/51; 382/226; 382/194; 382/186; 382/185; 382/177; 379/88.03; 375/341; 375/288
(58) Field of Classification Search
USPC ............. 704/275, 4, 270, 254, 238, 233, 231, 704/220, 219, 10; 382/229, 228, 226, 194, 382/186, 185, 177; 715/268, 259; 714/795; 707/3; 701/51; 379/88.03; 375/341, 288
See application file for complete search history.

(56) References Cited

U.S. PATENT DOCUMENTS 4,284,975 A * 8/1981 Odaka ........................... 382/185
4,400,828 A * 8/1983 Pirz et al. ...................... 704/238
(Continued)

FOREIGN PATENT DOCUMENTS
EP 1 052 576 11/2000

OTHER PUBLICATIONS

Shang H et al.: Tries for Approximate String Matching. IEEE Transactions on Knowledge and Data Engineering, vol. 8, No. 4, Aug. 1996. See pp. 540-547, figure 5 and abstract.

(Continued)

*Primary Examiner* — Michael Colucci
(74) *Attorney, Agent, or Firm* — Young & Thompson

(57) ABSTRACT

A method for searching for an input symbol string, includes receiving (B) an input symbol string, proceeding (C) in a trie data structure to a calculation point indicated by the next symbol, calculating (D) distances at the calculation point, selecting (E) repeatedly the next branch to follow (C) to the next calculation point to repeat the calculation (D). After the calculation (G), selecting the symbol string having the shortest distance to the input symbol string on the basis of the performed calculations. To minimize the number of calculations, not only the distances are calculated (D) at the calculation points, but also the smallest possible length difference corresponding to each distance, and on the basis of each distance and corresponding length difference a reference value is calculated, and the branch is selected (E) in such a manner that next the routine proceeds from the calculation point producing the lowest reference value.

7 Claims, 8 Drawing Sheets

(56) References Cited

U.S. PATENT DOCUMENTS

| | | | |
|---|---|---|---|
| 5,144,671 A * | 9/1992 | Mazor et al. | 704/220 |
| 5,353,376 A * | 10/1994 | Oh et al. | 704/233 |
| 5,377,281 A * | 12/1994 | Ballard et al. | 382/229 |
| 5,559,897 A * | 9/1996 | Brown et al. | 382/186 |
| 5,655,031 A * | 8/1997 | Yukawa et al. | 382/194 |
| 5,699,456 A * | 12/1997 | Brown et al. | 382/226 |
| 5,768,423 A * | 6/1998 | Aref et al. | 382/228 |
| 5,778,405 A * | 7/1998 | Ogawa | 715/259 |
| 5,799,299 A * | 8/1998 | Fujiwara | 1/1 |
| 6,243,493 B1 * | 6/2001 | Brown et al. | 382/186 |
| 6,351,698 B1 * | 2/2002 | Kubota et al. | 701/51 |
| 6,370,237 B1 * | 4/2002 | Schier | 379/88.03 |
| 6,377,945 B1 * | 4/2002 | Risvik | 1/1 |
| 6,438,181 B1 * | 8/2002 | Setlur et al. | 375/341 |
| 6,490,555 B1 * | 12/2002 | Yegnanarayanan et al. | 704/231 |
| 6,560,576 B1 * | 5/2003 | Cohen et al. | 704/270 |
| 6,792,570 B2 * | 9/2004 | Takahashi et al. | 714/795 |
| 6,944,237 B2 * | 9/2005 | Agazzi et al. | 375/288 |
| 6,985,861 B2 * | 1/2006 | Van Thong et al. | 704/254 |
| 7,027,974 B1 * | 4/2006 | Busch et al. | 704/4 |
| 7,043,439 B2 * | 5/2006 | Jost et al. | 704/275 |
| 7,092,567 B2 * | 8/2006 | Ma et al. | 382/177 |
| 7,263,480 B2 * | 8/2007 | Minde et al. | 704/219 |
| 2002/0002550 A1 * | 1/2002 | Berman | 707/3 |
| 2002/0099536 A1 * | 7/2002 | Bordner et al. | 704/10 |
| 2002/0165873 A1 * | 11/2002 | Kwok et al. | 707/500 |

OTHER PUBLICATIONS

Ukkonen, Esko: Finding Approximate Patterns in Strings. Journal of Algorithms 6, 132-137 (1984). See p. 132-137 and Abstract.

* cited by examiner

SEARCHING FOR SYMBOL STRING

FIELD OF THE INVENTION

The present invention relates to the search of an input symbol string among symbol strings. The invention is especially well suited for use in error-correcting database searches, in which the correct symbol string or the symbol strings closest to it are found in spite of an error in the input.

BACKGROUND OF THE INVENTION

Speech recognition, optical reading, correspondence searches of gene and protein sequences in bioinformatics, and database searches in general are examples of situations, in which there is a need to find a specific input symbol string among symbol strings. The symbol string can then be made up for example of consecutive characters or consecutive symbols representing phonemes. Often there is a danger that the input symbol string is not completely correct. The aim is, however, to find among the symbol strings of a database, for instance, the symbol string that completely corresponds to the input symbol string, or the symbol string that resembles it the most, if a fully corresponding input symbol string cannot be found.

A solution for searching for a symbol string is previously known, in which the symbol string is searched among symbol strings made into a trie data structure. The symbol strings are then grouped into branches in such a manner that all symbol strings starting with the same symbols belong to the same branch. The symbol strings in one branch divide into new branches at the symbols, from which onwards the symbol strings differ from each other.

The "tree-like" trie data structure has been employed in the search for symbol strings in such a manner that the branches of a data structure are searched until the leaves. Each new symbol encountered on the branch indicates a calculation point, at which a distance is calculated between a sample symbol string formed by the symbols of the calculation point and the calculation points preceding it and the searched input symbol string by comparing them in alternative ways. The distance refers to any reference value that describes how many changes are required to make the compared symbol strings correspond to each other. One known way of calculating the distance is the Levenshtein algorithm.

The calculation ends when the distances for all calculation points of all branches of the trie data structure are calculated. After this, a comparison is made to find the shortest distance. To produce a response, the symbol string of the branch or the symbol strings of the branches with the shortest distances in the last calculation points are selected.

The most significant weakness of the above-mentioned prior-art solution is that it requires a relatively large amount of calculation. The best possible symbol string, i.e. the one closest to the input symbol string, can only be found after all calculation points in the trie data structure are calculated. Because in database searches, for instance, the number of symbol strings in the database is extremely large, this means that the number of required calculations becomes very large and, therefore, the time required for the calculations is long. Obtaining a response to the input, therefore, requires a lot of time.

BRIEF DESCRIPTION OF THE INVENTION

It is an object of the present invention to solve the above-mentioned problem and to provide a solution that makes it possible to reduce the number of calculations required to produce a response, thus making the production of the response faster than before.

The solution of the invention is based on the idea that the number of calculations required to search for the symbol string and, thus, to produce a response can be significantly reduced, when for each distance, the shortest possible length difference corresponding to it is also calculated, as well as a reference value on the basis of the distance and the length difference. Said reference value then indicates the best possible distance that can theoretically be achieved when proceeding to the end of the branch in question, upon the condition that all the symbols remaining on the branch correspond to the unexamined symbols of the input. In such a situation, the deciding factor is the length differences between the input and the symbol strings. When the input and symbol string are of different length, each "extra" symbol increases the distance between them. Because it is possible to determine the best possible reference value at each calculation point, it is also possible to determine by comparing the reference values, which of the branches may provide the shortest possible distance. In such a case, only the branches in question are examined and calculation is skipped on the branches whose reference value indicates that a better distance than in the other branches cannot be achieved in them.

Due to the solution of the invention, calculation can be skipped for a large part of the calculation points on the branches of the trie data structure without endangering the finding of the best symbol string. This, in turn, reduces significantly the time required for calculation, and the search for the best symbol string or symbol strings is faster than before.

In one preferred embodiment of the invention, the distance of the symbol string (or symbol strings) used in producing the response and the input symbol string are compared with a predefined maximum distance, i.e. limit value. If the distance exceeds the maximum distance, this means that the found symbol string differs so much from the input symbol string that forwarding it in a response is not expedient (a symbol string that sufficiently resembles the input symbol string has not been found). The produced response is then altered before it is transmitted to indicate that the input symbol string was not found.

In a second preferred embodiment of the invention, said lowest reference value is compared during branch selection with a predefined maximum distance, and the calculation is ended if the lowest reference value exceeds the maximum distance. The reference value represents the best possible obtainable distance, if the rest of the symbols on the branch correspond to the symbols left in the input and the numbers of symbols match. If, under the circumstances, the lowest reference value exceeds the maximum distance, it means that the input symbol string or one resembling it will not be found among the symbol strings, and the calculation and, at the same time, the search for the input symbol string can be ended as unnecessary.

A third preferred embodiment of the invention checks during branch selection, whether calculation has already been done for the last calculation point on one of the branches, and ends the calculation, if it turns out that for the last calculation point on a branch, a reference value has been obtained that is lower than the reference values obtained from all the other calculation points. This way, the calculation and symbol string search can be ended already before calculating all calculation points on all branches, because due to the use of the reference values, it has been established that the symbol string of a branch calculated to the end corresponds best to the input symbol string.

Preferred embodiments of the method of the invention are set forth in the attached claims.

BRIEF DESCRIPTION OF THE FIGURES

In the following, the invention will be described by way of example in greater detail with reference to the attached figures, in which.

DESCRIPTION OF THE PREFERRED EMBODIMENTS

In the following, the invention will be described by way of example in greater detail with reference to the flow chart of FIG. 1 and the calculation example of FIGS. 2a to 2f.

Figure 1:
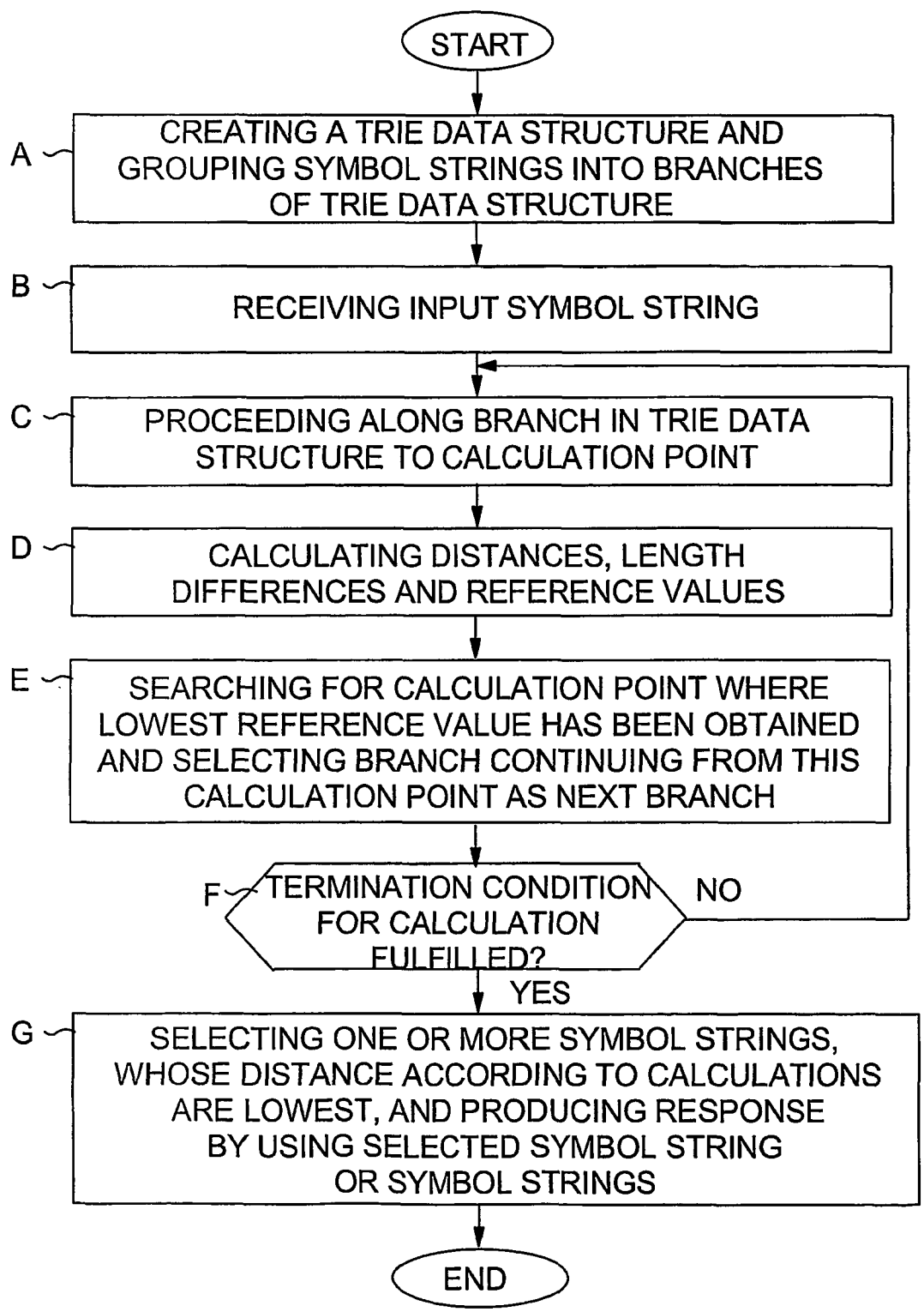
FIG. 1 is a flow chart of the first preferred embodiment of the method of the invention.
Figure 2A:
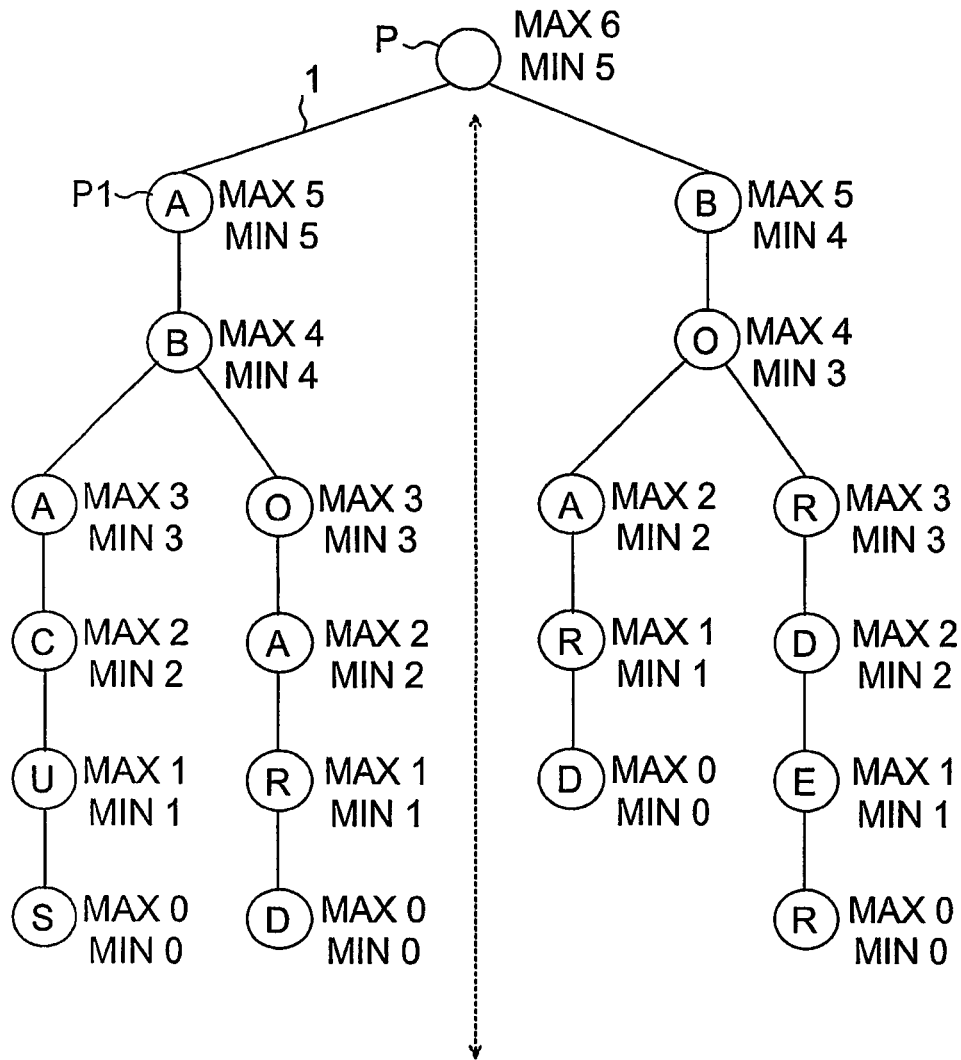
FIGS. 2a to 2f illustrate the progress of the search for the input symbol string when following the flow chart of FIG. 1.

In block A of FIG. 1, a trie data structure is created in a manner known per se and the symbol strings are grouped into branches of the trie data structure. FIG. 2a shows this type of data structure with grouped symbol strings: ABACUS, ABOARD, BOARD, and BORDER. The creation of a trie data structure is a step that does not necessarily need to be repeated each time a new symbol string is searched from the database. The earlier created data structure can be utilized for instance as long as no new symbol strings are added to the database. That is, only when a new symbol string is added to the database, will the creation of a new trie data structure be necessary.

In block B of FIG. 1, an input symbol string, i.e. the symbol string that will be searched for among the set of symbol strings, is received. The next description assumes by way of example that the searched input symbol string is ABORD.

In block C, the routine starts by proceeding to the first calculation point P, at which according to block D, the distance between the input and a sample symbol string formed by the symbols of the calculation point of the branch in question and the calculation points preceding it is calculated in a manner known per se by using the Levenshtein algorithm. In addition, according to the invention, length differences D and reference values R are calculated as follows. For calculation point P, the sample symbol string is " " (empty character in the beginning) and the input symbol string is (with the empty character added to the beginning) "ABORD". The calculation proceeds as follows.

The distance between empty characters " " is 0, because the characters match each other. There are 5 characters left in the input symbol string, and 5 to 6 characters left in the length of the symbol strings passing through point P, which is marked at point P as max 6, min 5. The shortest possible length difference is thus 5−5=0. The reference value is distance+length difference, i.e. 0+0=0.

The distance between the symbol strings " " and "A" is 1, because the symbol strings being compared match each other by adding/changing one character. There are 4 more characters left in the input symbol string, and 5 to 6 characters left in the length of the symbol strings passing through point P. The shortest possible length difference is thus 5−4=1. The reference value is 1+1=2.

The distance between the symbol strings " " and "AB" is 2, because the symbol strings being compared match each other by adding/changing two characters. There are 3 more characters left in the input symbol string, and 5 to 6 characters left in the length of the symbol strings passing through point P. The shortest possible length difference is thus 5−3=2. The reference value is 2+2=4.

The distance between the symbol strings " " and "ABO" is 3, because the symbol strings being compared match each other by adding/changing three characters. There are 2 more characters left in the input symbol string, and 5 to 6 characters left in the length of the symbol strings passing through point P. The shortest possible length difference is thus 5−2=3. The reference value is 3+3=6.

When the compared symbol strings have been compared in all alternative ways, the results shown in the table at the bottom of FIG. 2a are obtained.

In block E, the calculation point is searched that has provided the lowest reference value. The lowest reference value has been obtained for point P, which is the only calculation point calculated so far. Therefore, the routine proceeds from this calculation point along branch 1.

In block F, it is checked whether the condition to terminate the calculation is fulfilled. There may be several termination conditions. The following mentions by way of example two termination conditions.

Termination condition 1: The calculation is terminated, if the lowest reference value exceeds a predefined maximum distance. In such a case, the conclusion is that the searched input symbol string differs so much from the set of symbol strings that the search can be interrupted, because a symbol string resembling the input symbol string will not be found. The definition of a suitable maximum distance depends on the application. This example assumes that the maximum distance is 5.

Termination condition 2: The calculation is terminated, if, on a branch, the calculation has already been done for the last calculation point, and for the last calculation point, a reference value has been obtained that is lower than the reference values obtained for all the other calculation points. Therefore, the calculation and search for symbol string can be terminated already before the calculation is finished at the calculation points of all branches, because due to the use of the reference values, it has been established that the symbol string of a branch calculated to the end corresponds best to the input symbol string.

The table in FIG. 2a shows that the lowest reference value R is 0 that is smaller than the maximum distance 5. Therefore, the first termination condition is not fulfilled. The second termination condition is also not fulfilled, because the last calculation point has not yet been reached in any of the branches. Therefore, in the block diagram of FIG. 1, the routine enters block C, and in FIG. 2a, the routine proceeds along branch 1 to point P1.

The calculation according to Block D is repeated in point P1. The sample symbol string is "A" and the input symbol string is still "ABORD". To facilitate the calculation of the distances of point P1, the calculation is started using the distance calculations done in point P that are transferred to the table at the bottom of FIG. 2b. The calculation proceeds as follows.

The distance between the symbol strings "A" and " " is 1, because the symbol strings being compared match each other by adding/changing one character. There are 5 more characters left in the input symbol string, and 5 characters left in the length of the symbol strings passing through point P1, which is marked at point P1 as max 5 min 5. The shortest possible length difference D is thus 5−5=0. The reference value R is distance+length difference, i.e. 1+0=1.

The distance between the symbol strings "A" and "A" is 0, the symbol strings match each other. There are 4 more characters left in the input symbol string, and 5 characters left in the length of the symbol strings passing through point P1. The shortest possible length difference is thus 5−4=1. The reference value is 0+1=1.

The distance between the symbol strings "A" and "AB" is 1, because the symbol strings being compared match each other by adding/changing one character. There are 2 more characters left in the input symbol string, and 3 characters left in the length of the symbol strings passing through point P1. The shortest possible length difference is thus 5−3=2. The reference value is 1+2=3.

The distance between the symbol strings "A" and "ABO" is 2, because the symbol strings being compared match each other by adding/changing two characters. There are 2 more characters left in the input symbol string, and 5 characters left in the length of the symbol strings passing through point P. The shortest possible length difference is thus 5−2=3. The reference value is 2+3=5.

Figure 2B:
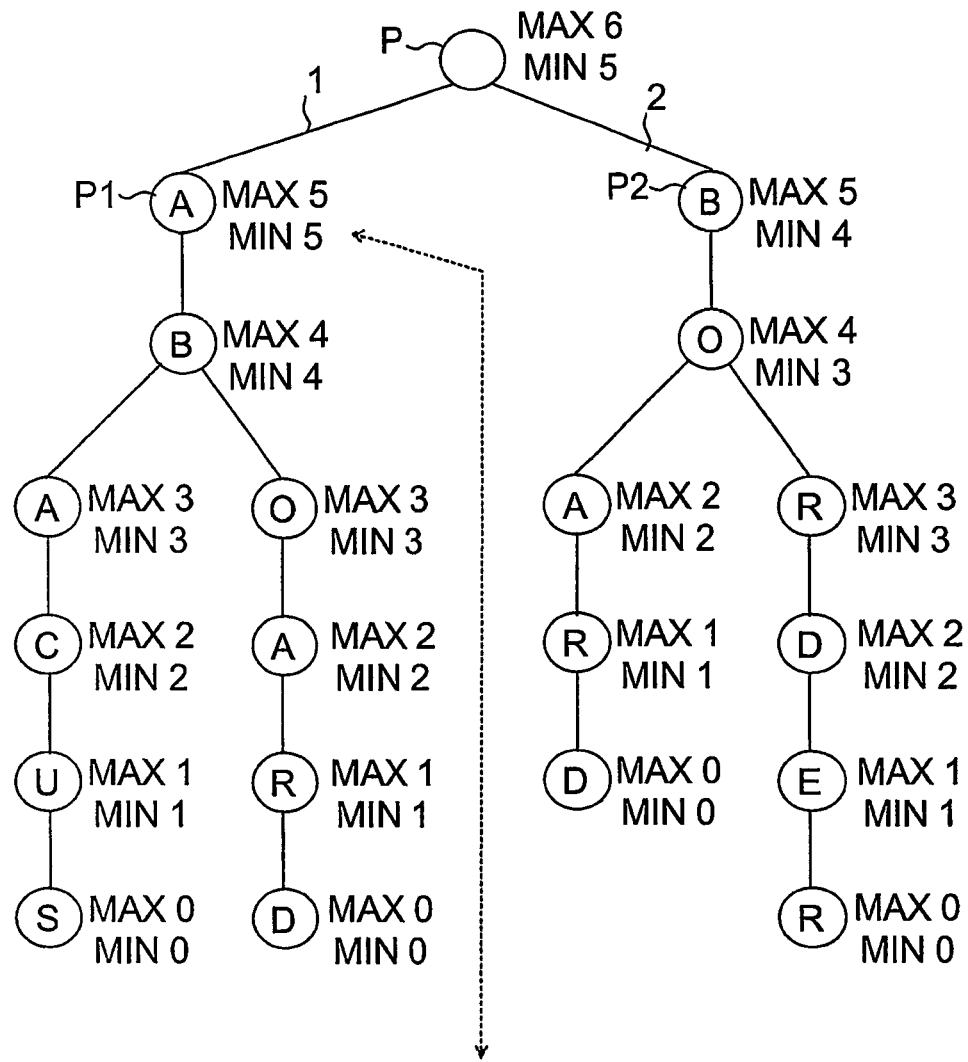

When the compared symbol strings have been compared in all alternative ways, the results shown in the table at the bottom of FIG. 2b are obtained. It should be noted, however, that the above method for calculating distances between compared symbol strings is only one example, and in addition to it, there are other known and possibly even simpler methods. It is not essential for the invention how the distances are calculated. One alternative for calculating distances is to utilize a table of the type shown at the bottom of FIG. 2b, and especially the preceding calculated distance column.

When the calculation of point P1 is done, the calculation point with the lowest reference value R is again searched for in block E. The result is point P whose reference value is 0 that is lower than the lowest reference value 1 of point P1. Therefore, the routine proceeds next along branch 2 to point P2. In block F, it is detected that the termination conditions are not fulfilled, after which the routine enters block C to repeat the calculations for point P2.

Figure 2C:
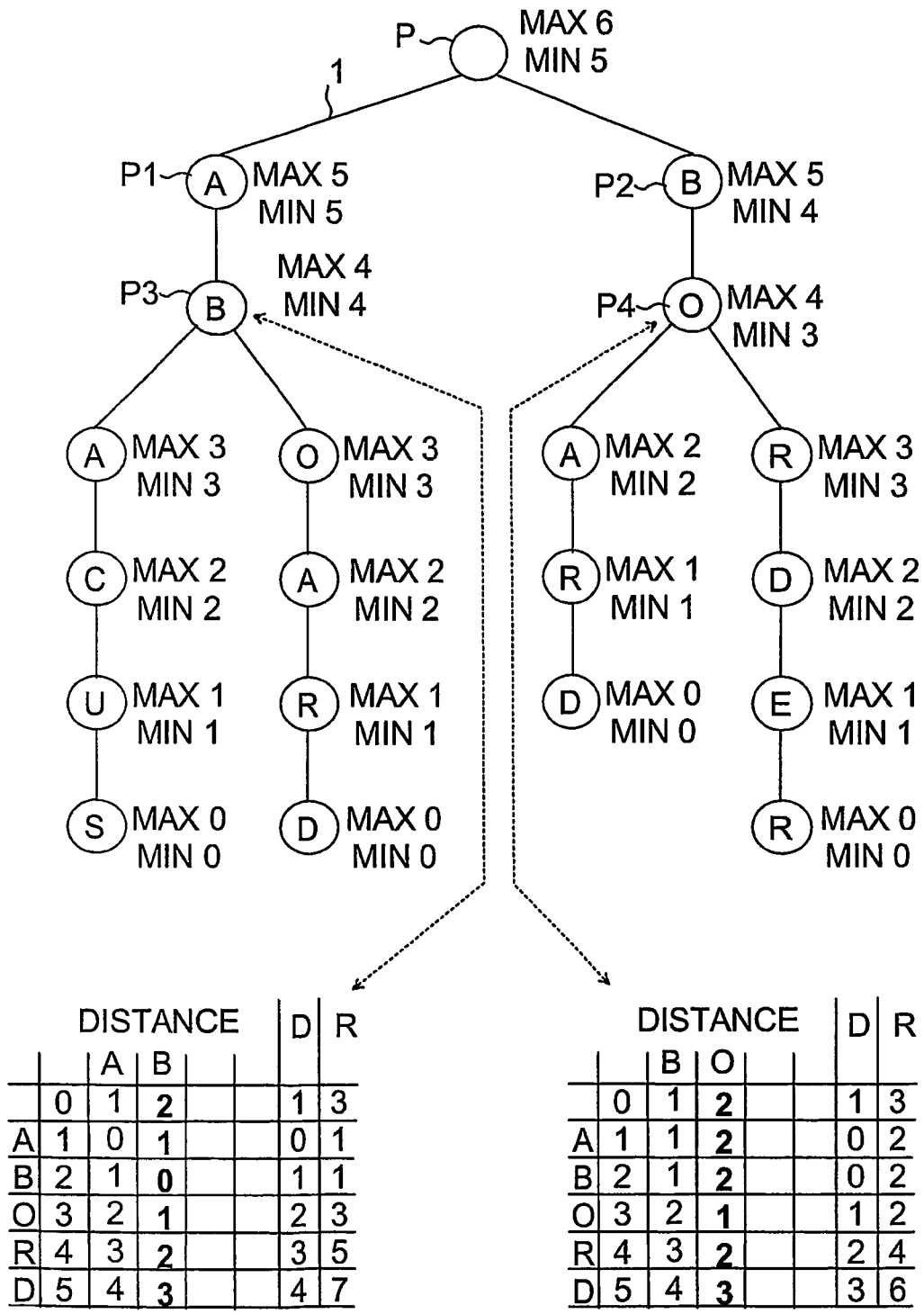

In the following, the calculations of all calculation points are not examined, but the routine moves directly to the situation shown in FIG. 2c, in which the calculations are done for points P3 and P4. In block E of the block diagram of FIG. 1, it is then found that the lowest reference value R is obtained at calculation point P3, the lowest reference value R of which is 1 in FIG. 2c, whereas the lowest reference value R at point P4 is 2. Therefore, the routine proceeds next along the branch of calculation point P3.

Figure 2D:
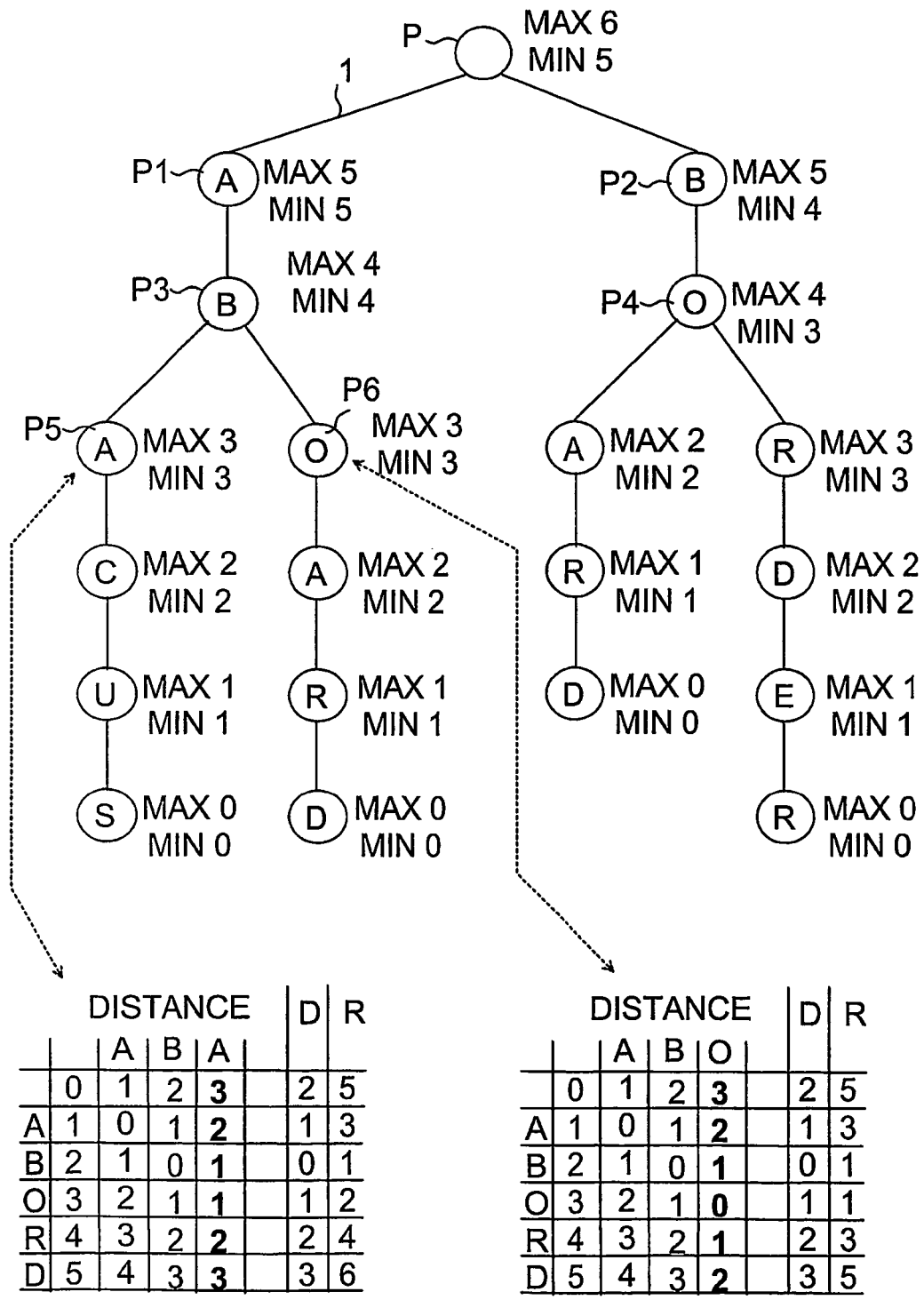

FIG. 2d shows a situation, in which the calculations of calculation points P5 and P6 are done. In block E of the block diagram of FIG. 1, it is then found that the lowest reference value R is obtained at two calculation points, i.e. the lowest reference value of both calculation point P5 and P6 is 1. Next, the routine follows the branch of calculation point P5.

Figure 2E:
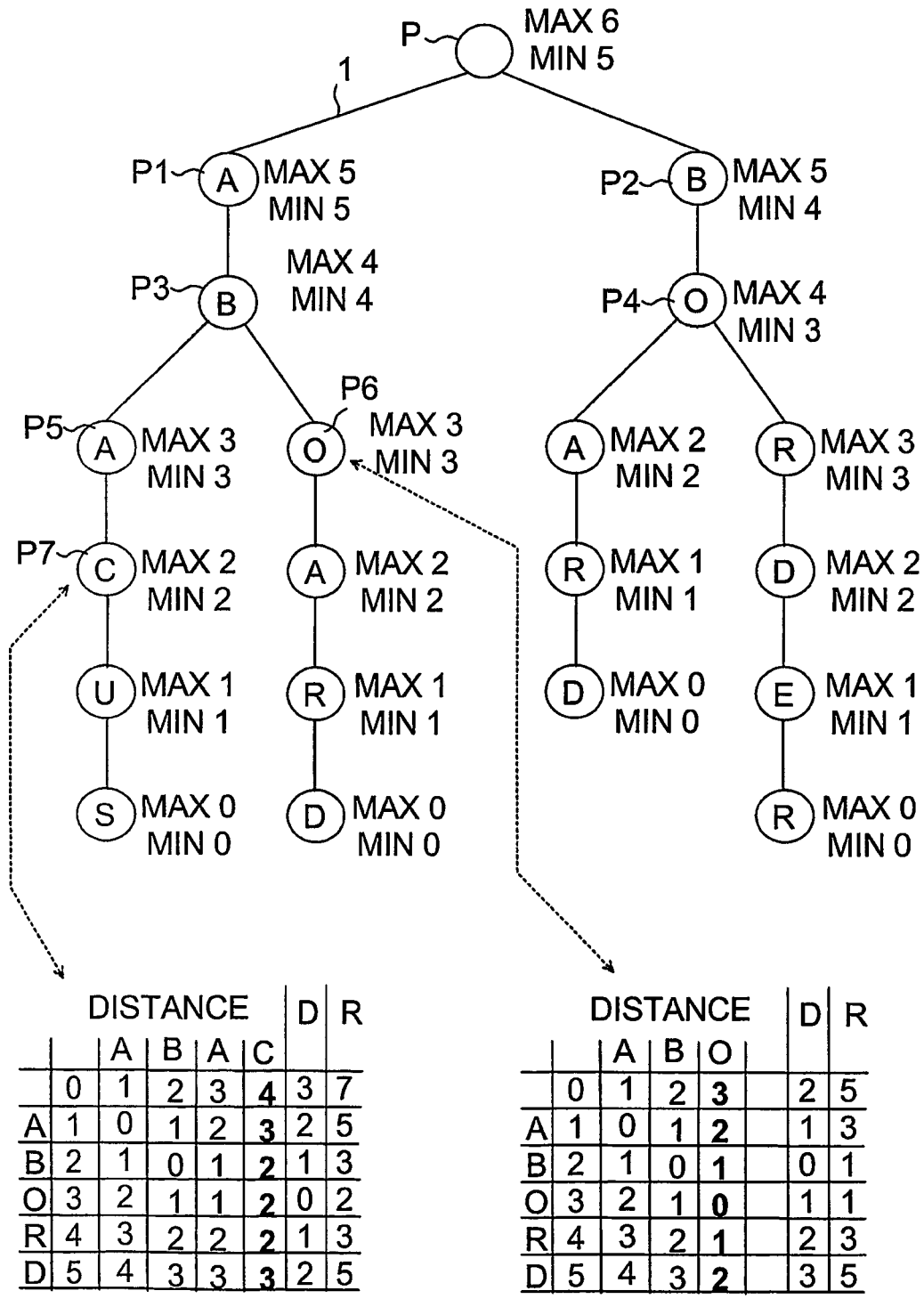

FIG. 2e shows a situation, in which the calculations of calculation point P7 are done. In block E of the block diagram of FIG. 1, it is then found that the lowest reference value R is obtained at calculation point P6, at which the lowest reference value R is 1 (the lowest reference value R of calculation point P7 is 2). Next, the routine follows the branch of calculation point P6.

Figure 2F:
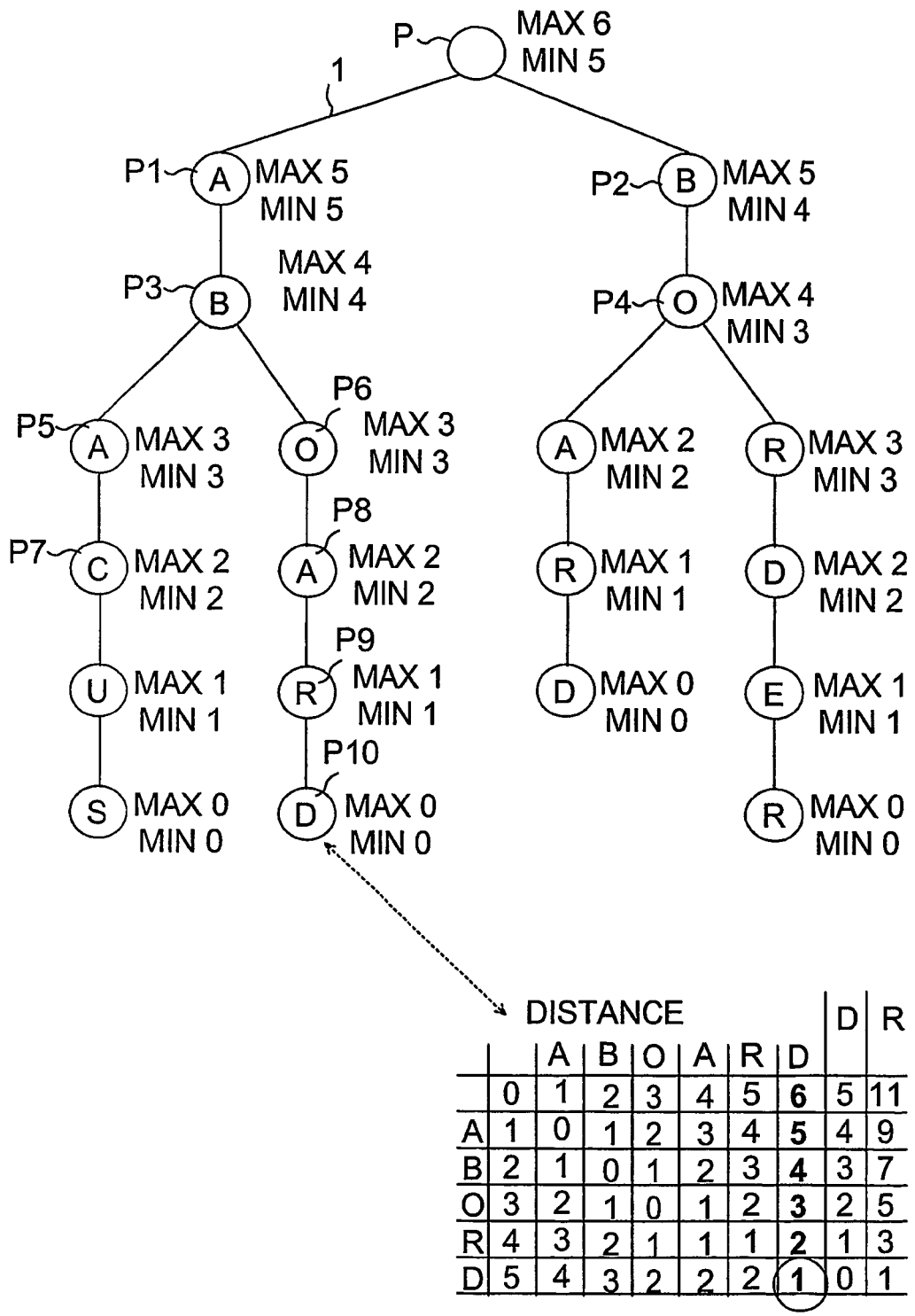

The figures do not show all intermediate steps, but when the calculations are repeated at calculation points P9 and P10, the reference value R is 1 for these points. When the calculations are again repeated at calculation point P10, the situation is as shown in FIG. 2f, when block E of the block diagram of FIG. 1 is again reached. The lowest reference value R of calculation point P10 is 1. Because the reference values of the calculation point calculated last in all the other branches (on the branch, to which point P7 belongs, R=2, and on the branch, to which point P4 belongs, R=2) are higher than the reference value R=1 of calculation point P10, it is calculation point P10, from which the routine should proceed next. However, calculation point P10 is the last calculation point on the branch. Therefore, in block F, it is found that the termination condition 2 described above is fulfilled, and calculation can be terminated.

In block G, the symbol string of the branch that led to calculation point P10 is selected for producing the response. The symbol string in question is ABOARD. This symbol string is provided as response to the input.

Differing from the block diagram of FIG. 1, it is possible to make an extra check after block G. Then, the distance of the symbol string (or symbol strings) used to produce the response and that of the input symbol string are compared with a predefined maximum distance, i.e. limit value. In the situation of FIG. 2f, the distance between the symbol string ABOARD used to produce the response and the input symbol string ABORD is 1 (circled in FIG. 2f). If the distance exceeds the maximum distance, it means that the found symbol string differs so much from the input symbol string that transmitting it on in the response is not expedient (a close enough symbol string has not been found). The produced response is then changed before it is transmitted on to indicate that the input symbol string was not found. This way, it is possible to avoid a situation, in which the response becomes a symbol string that is very much different from the input symbol string.

Figure 3:
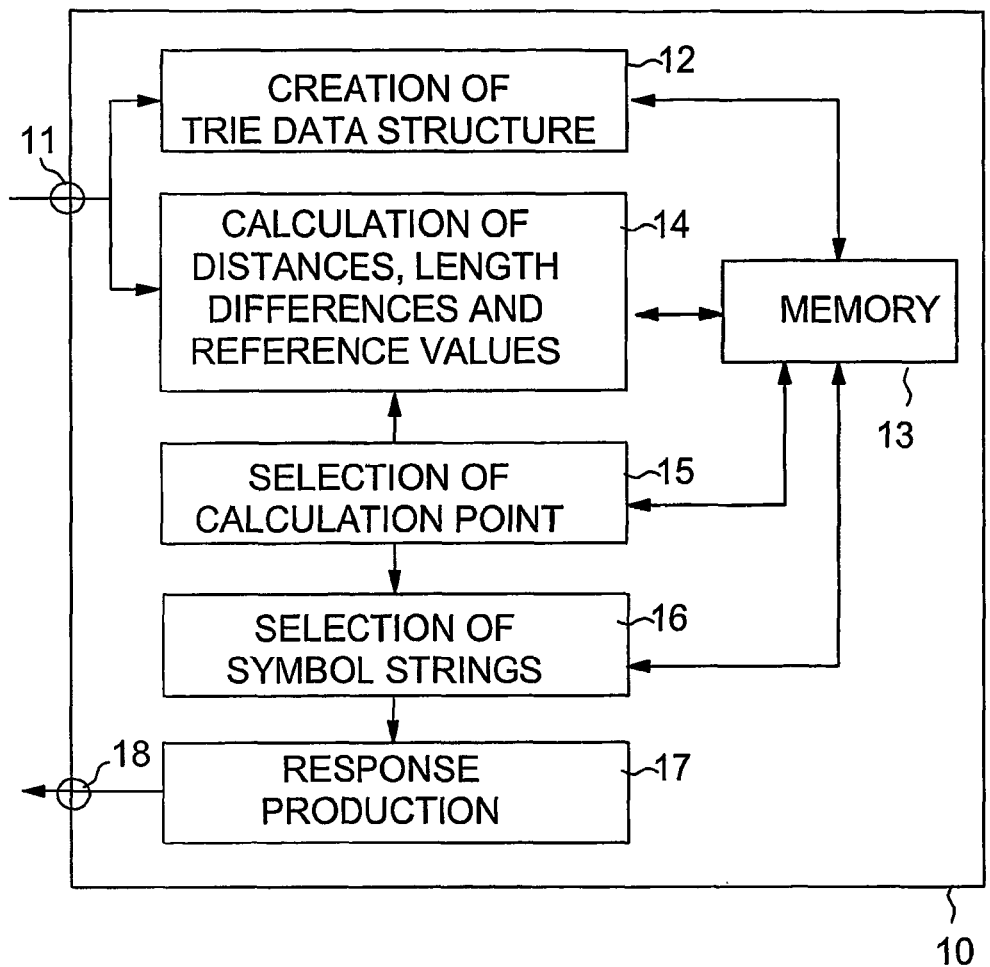
FIG. 3 is a block diagram of the first preferred embodiment of the apparatus of the invention.

FIG. 3 is a block diagram of the first preferred embodiment of the apparatus of the invention. In FIG. 3, the apparatus 10 is illustrated using functional blocks 11 to 18. However, it is important to note that the actual structure of the apparatus may differ from what is shown in FIG. 3. The functions of the blocks in FIG. 3 can in practice be implemented by one or more circuits or computer programs, or alternatively by a combination of circuits and programs. It is then also possible that the functions of the apparatus are not implemented exactly as illustrated, but the functions of one or more blocks can be combined in one circuit or program.

The apparatus 10, by means of which the method described in FIGS. 1 and 2a to 2f can be used, can be a computer connected to a telecommunications network and containing a memory 13 with a database of symbol strings in it. The apparatus comprises means 12 for creating a trie data structure by grouping the symbol strings stored in the memory 13 into branches of the trie data structure.

When the trie data structure is created and an input symbol string received through an input 11 of the apparatus, the apparatus 10 begins to search for the symbol string that best corresponds to the input symbol string in the memory 13. To do this, the apparatus comprises calculation means 14 for calculating distances, length differences and reference values between a sample symbol string formed by the calculation point and the calculation points preceding it in the examined branch and the input symbol string by comparing these in alternative ways.

The apparatus also has selection means 15 that repeatedly select the next branch, along which to proceed, and indicate to the calculation means 14 the next calculation point for calculation, as earlier described in connection with the flow chart of FIG. 1. When the selection means 15 detect that a termination condition is fulfilled, i.e. that the calculation should be terminated, they inform means 16 of this.

The means 16 select on the basis of the information in the memory 13 one or more symbol strings, the distance of which to the input symbol string is the shortest on the basis of the performed calculations. After this, production means 17 produce and transmit through an output 18 of the apparatus 10 a response, which is thus made up of the symbol string or symbol strings that most resemble the input symbol string.

It is to be understood that the above description and the related figures are only intended to illustrate the present invention. It will be apparent to a person skilled in the art that various modifications can be made to the invention without departing from the scope of the invention disclosed in the attached claims.

The invention claimed is:

1. A non-transitory computer readable medium encoded with a computer program for executing a method for searching for an input symbol string among a set of symbol strings, comprising:

creating a trie data structure of symbol strings, wherein the symbol strings are grouped into branches in such a manner that the symbol strings beginning with the same symbols belong to the same branch, and the symbol strings in the same branch divide into new branches at the symbols, from which onwards the symbols strings differ from each other, receiving an input formed of an input symbol string, proceeding from the starting point of the trie data structure along a branch to a calculation point indicated by the next symbol, calculating distances at the calculation point between a sample symbol string formed by the symbols of the calculation point of the branch in question and the calculation points preceding it and the input symbol string by comparing these in alternative ways, calculating at the calculation point also the smallest possible length difference corresponding to each distance that indicates how much the length of the remaining part of the input symbol string not examined in the distance calculation differs from the lengths remaining in the symbols strings passing through the calculation point, and calculating on the basis of each distance and corresponding length difference a reference value, selecting repeatedly the next branch to follow to the calculation point indicated by the next symbol, at which said calculation is repeated for the new calculation point, said selection of the next branch being performed in such a manner that next the routine proceeds from the calculation point, from which the lowest reference value has been obtained as result, after the calculation has terminated, selecting one or more symbol strings having the shortest distance to the input symbol string on the basis of the performed calculations, and using the selected symbol string(s) to produce a response.

2. The non-transitory computer readable medium encoded with a computer program for executing the method as claimed in claim 1, further comprising:

comparing the distance of the symbol string or strings used to produce the response and that of the input symbol string with a predefined maximum distance, and changing the produced response to indicate that the input symbol string was not found if the distance exceeds the maximum distance.

3. The non-transitory computer readable medium encoded with a computer program for executing the method as claimed in claim 1, further comprising:

when selecting the branch, comparing said lowest reference value with the predefined maximum distance, and terminating the calculation if the lowest reference value exceeds the maximum distance.

4. The non-transitory computer readable medium encoded with a computer program for executing the method as claimed in claim 1, further comprising:

when selecting the branch, checking whether calculation is already done for the last calculation point on one of the branches, and terminating the calculation, if it turns out that for the last calculation point of one of the branches a reference value has been obtained that is lower than the reference values obtained for all the other calculation points.

5. The non-transitory computer readable medium encoded with a computer program for executing the method as claimed in claim 2, further comprising:

when selecting the branch, comparing said lowest reference value with the predefined maximum distance, and terminating the calculation if the lowest reference value exceeds the maximum distance.

6. An apparatus loadable with a computer readable medium encoded with a computer program for searching for a symbol string among a set of symbol strings, the apparatus comprising:

means for creating a trie data structure of symbols strings by grouping the symbol strings into branches in such a manner that the symbol strings starting with the same symbols belong to the same branch, and the symbols strings in the same branch divide into new branches at the symbols, from which onwards the symbol strings differ from each other, an input for receiving an input symbol string, calculation means for calculating distances between a sample symbol string formed by the symbols of the calculation point and the calculation points preceding it in the examined branch and the input symbol string by comparing these in alternative ways, and for calculating at the calculation points also the smallest possible length difference corresponding to each distance that indicates how much the length of the remaining part of the input symbol string not examined in the distance calculation differs from the lengths remaining in the symbols strings passing through the calculation point, and calculating on the basis of each distance and corresponding length difference a reference value, selection means that repeatedly select the next branch to follow to the calculation point indicated by the next symbol, at which said calculation is repeated for the new calculation point, said selection means carrying out the branch selection in such a manner that next the routine proceeds from the calculation point, from which the lowest reference value has been obtained as result, selection means that, after the calculation is terminated, select one or more symbol strings with the shortest distance to the input on the basis of the calculations, response production means that produce a response by using the selected symbol string(s), and an output for feeding the response onward.

7. An apparatus including at least one circuit for searching for a symbol string among a set of symbol strings, the apparatus comprising:

means for creating a trie data structure of symbols strings by grouping the symbol strings into branches in such a manner that the symbol strings starting with the same symbols belong to the same branch, and the symbols strings in the same branch divide into new branches at the symbols, from which onwards the symbol strings differ from each other, an input for receiving an input symbol string, calculation means for calculating distances between a sample symbol string formed by the symbols of the calculation point and the calculation points preceding it in the examined branch and the input symbol string by comparing these in alternative ways, and for calculating at the calculation points also the smallest possible length difference corresponding to each distance that indicates how much the length of the remaining part of the input symbol string not examined in the distance calculation differs from the lengths remaining in the symbols strings passing through the calculation point, and calculating on the basis of each distance and corresponding length difference a reference value, selection means that repeatedly select the next branch to follow to the calculation point indicated by the next symbol, at which said calculation is repeated for the new calculation point, said selection means carrying out the branch selection in such a manner that next the routine proceeds from the calculation point, from which the lowest reference value has been obtained as result, selection means that, after the calculation is terminated, select one or more symbol strings with the shortest distance to the input on the basis of the calculations, response production means that produce a response by using the selected symbol string(s), and an output for feeding the response onward.

* * * * *

UNITED STATES PATENT AND TRADEMARK OFFICE
CERTIFICATE OF CORRECTION

PATENT NO.       : 8,532,988 B2                                        Page 1 of 1
APPLICATION NO. : 10/520171
DATED            : September 10, 2013
INVENTOR(S)      : Jorkki Hyvonen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2645 days.

Signed and Sealed this

Fifteenth Day of September, 2015

Michelle K. Lee
*Director of the United States Patent and Trademark Office*